United States Patent
Schmidt

(10) Patent No.: US 8,511,152 B2
(45) Date of Patent: *Aug. 20, 2013

(54) METHOD FOR ANALYZING THE STEP-BY-STEP INJECTION RATE PROVIDED BY A FUEL INJECTION SYSTEM USED IN A HIGH POWER HEAT ENGINE

(75) Inventor: Francois Schmidt, Millery (FR)

(73) Assignee: EFS SA (FR)

( * ) Notice: Subject to any disclaimer, the term of this patent is extended or adjusted under 35 U.S.C. 154(b) by 198 days.

This patent is subject to a terminal disclaimer.

(21) Appl. No.: 13/061,994

(22) PCT Filed: Jul. 20, 2009

(86) PCT No.: PCT/FR2009/051437
§ 371 (c)(1),
(2), (4) Date: Apr. 20, 2011

(87) PCT Pub. No.: WO2010/026321
PCT Pub. Date: Mar. 11, 2010

(65) Prior Publication Data
US 2011/0185799 A1    Aug. 4, 2011

(30) Foreign Application Priority Data
Sep. 5, 2008    (FR) ...................................... 08 04881

(51) Int. Cl.
*G01M 15/09*    (2006.01)
(52) U.S. Cl.
USPC ........................................................ 73/114.48
(58) Field of Classification Search
USPC ............... 73/114.45, 114.46, 114.47, 114.48, 73/114.49, 114.51
See application file for complete search history.

(56) References Cited

U.S. PATENT DOCUMENTS

| | | | | |
|---|---|---|---|---|
| 4,461,169 | A * | 7/1984 | Augustin | 73/114.48 |
| 6,755,076 | B1 * | 6/2004 | Schmidt et al. | 73/114.47 |
| 7,197,918 | B2 * | 4/2007 | Shen | 73/114.51 |
| 8,333,110 | B2 * | 12/2012 | Schmidt | 73/114.51 |
| 2005/0034514 | A1 * | 2/2005 | Shen | 73/119 A |
| 2011/0185800 | A1 * | 8/2011 | Schmidt | 73/114.51 |

FOREIGN PATENT DOCUMENTS

| | | |
|---|---|---|
| DE | 4130394 A1 | 3/1992 |
| EP | 0861979 A2 | 9/1998 |
| FR | 2795139 A1 | 12/2000 |

OTHER PUBLICATIONS

International Search Report PCT/FR2009/051437; Dated Nov. 19, 2009.

* cited by examiner

*Primary Examiner* — Eric S McCall
(74) *Attorney, Agent, or Firm* — Cantor Colburn LLP

(57) ABSTRACT

The method of the invention includes the injection of fuel in a first constant-volume measuring chamber (3) in which the pressure (P) and the temperature (T) are measured, and the partial draining of said first chamber into a second variable-volume measuring chamber (8) based on the movement of a piston (11), said movement being measured, wherein the partial draining of the first chamber into the second chamber after an injection is carried out until the pressure (Po) existing in the first chamber before the injection is recovered. The draining of the first chamber into the second after each injection is carried out several times consecutively, and the second chamber itself is drained each time. The volumetric measures made by moving the piston (11) for each filling/draining of the second chamber are added in order to obtain a total volume. The method is useful for high injection rates.

2 Claims, 2 Drawing Sheets

METHOD FOR ANALYZING THE STEP-BY-STEP INJECTION RATE PROVIDED BY A FUEL INJECTION SYSTEM USED IN A HIGH POWER HEAT ENGINE

TECHNICAL FIELD

The present invention relates to a method making it possible to analyze the step-by-step injection rate provided by a fuel injection system used in a heat engine. The concerned injection systems are in particular those equipping diesel engines. The invention described here is more particularly applicable to injection systems used in high power engines, therefore injection systems with a high fuel flow.

BACKGROUND

Measuring devices are already known for allowing the builders of injection systems and heat engines to develop injectors as well as perform adjustments and compliance verifications during production and during the installation of these systems for their final use. These measuring devices are used in conjunction with a specific test block, the role of which is primarily to drive the rotation of an injection pump and support the different elements of the injection system during tests. The measurements done with these types of devices must make it possible to precisely know both the values of injected fuel volumes and the injection times or angles.

To that end, already known from French patent FR 2795139 A or its equivalent, European patent EP 1187987 B1, in the Applicant's name, is a device making it possible to instantaneously analyze the step-by-step injection rate provided by an injection system used in a heat engine, this device being characterized essentially by the combination of two measuring chambers.

Thus, the device mentioned here includes a first chamber for measuring a constant volume chamber in which the fuel is injected, with which chamber a pressure sensor and a temperature sensor are associated that respectively measure the pressure and the temperature reigning in that chamber, as well as means making it possible to at least partially empty said first measuring chamber.

This device also includes, downstream of the first measuring chamber, a second measuring chamber in which the fuel drained from the first measuring chamber is sent, the volume of the second measuring chamber varying depending on the movement of a piston whereof the movement is measured using a movement sensor.

An electronic section controls the device assembly, said section also analyzing the information received from the different sensors.

The operating principle of this device is as follows:

When the device is ready to perform a measurement, i.e. when fuel is present in the two measuring chambers and a predetermined set pressure reigns in the first measuring chamber, an injection is done. This causes an increase of the pressure in the first measuring chamber, related to the amount of injected fuel, the characteristics of the fuel, the environmental conditions, and in particular the temperature and the initial pressure, and the volume of the chamber. At the end of the injection, the fuel contained in the first measuring chamber is partially emptied into the second measuring chamber, the pressure in the first measuring chamber thus being brought back to its initial set value and this first measuring chamber being ready then to receive a new injection. The fuel that arrives in the second measuring chamber causes the volume to increase in this second measuring chamber, by pushing the piston. The movement of the piston is measured and, knowing the diameter of the piston, a part of the electronic section calculates the exact volume of the fuel. This second measurement allows the electronic section to calibrate, at any moment and very accurately, the measurements that are done by the first measuring chamber.

In one advantageous embodiment of the device, described in the aforementioned patent documents, a rapid electrovalve controlled by a portion of the electronic section, and a discharging device, are positioned between the two measuring chambers to partially drain the first measuring chamber after an injection until this first measuring chamber returns to the pressure that reigned therein before the considered injection. In this case, the electronic section also advantageously includes a compensation function, making it possible to take a potential pressure difference into account in the first measuring chamber after two successive emptyings.

The term "fuel," used here to qualify the fluid used in the device, in particular the fluid filling the two measuring chambers and also the injected fluid, designates an actual fuel or, preferably, a fluid that has hydraulic characteristics close to those of a fuel but with a flash point temperature much higher than that of a fuel in order to minimize the risks of fire and explosion.

Overall, the first measuring chamber, with a constant volume, makes it possible to precisely provide the "form" of the injection, while the second measuring chamber, with a variable volume, makes it possible to measure the amount of fuel injected. The processing done in the electronic section makes it possible to offset the flaws of each of the measurements by the qualities of the other.

The existing device, recalled above, is more particularly adapted to injectors that deliver a low or average amount of fuel, typically up to 100 liters per hour.

To develop high power injectors and engines, like those used to propel ships or to drive large electric generators, it is necessary to be able to perform instantaneous injection rate measurements, step by step, for more significant rates.

The production to that end of a larger measuring device, simply homothetic of the known device recalled above, faces difficulties in making the second measuring chamber, i.e. the variable-volume chamber used to perform a volume measurement via the movement of a piston.

For the first measuring chamber, which has a constant volume and is used to perform an instantaneous measurement of the pressure increase during the injection into this volume already filled with fluid, there is no technical difficulty in simply increasing the dimensions to adapt it to a higher rate. Instead of a volume typically smaller than a liter, unique to earlier embodiments, it is easy to provide a volume with a higher value, adapted to the injection pump and/or the injector that is found in the test. The value of this volume is to be determined, so as to obtain a typical increase of the pressure of several bars or tens of bars, in the first measuring chamber, during a single injection, which leads to a typical volume of several liters or tens of liters for this chamber, without these values being limiting. Thus, there would not be any drawback in principle of using still much larger volumes, if necessary, to measure very large instantaneous rates. The production of such a volume in fact remains simple, and does not pose any particular technical problems. It may potentially involve making a relatively thick, and therefore heavy, piece, due to the fact that it must resist an internal pressure that may typically go up to as much as 200 bars, but these conditions or requirements are not unusual for instrumentation of the type concerned here. Moreover, since it involves making a constant-volume chamber, without mobile parts or other delicate elements, this part will not be expensive and it will be particularly robust, regardless of its interior volume.

However, regarding the second, variable-volume measuring chamber with interior piston, difficulties arise, because this chamber must meet very strict technical imperatives, the main imperatives being:

The piston must slide perfectly, without locking or leaks, in the cylinder that delimits the measuring chamber, while the overall temperature of this chamber is generally kept relatively low, typically between 40 and 70° C., but the instantaneous temperature at the nose of the injector is high and can exceed 200° C. for modern injection systems with very high pressure, typically greater than 2000 bars.

The piston must be as light as possible in order to react quickly to the volume variations resulting from the emptying of fuel in the measuring chamber, which leads to making the piston with a hollow configuration and a very small wall thickness.

The assembly formed by the cylinder that delimits the measuring chamber, and by the piston slidingly mounted in that cylinder, must, however, be very robust to bear a large number of fuel injection cycles, therefore filling/emptying of said measuring chamber with movement of the piston, without damage.

Pistons are usually made whereof the diameter is between 10 and 35 millimeters, and that describe a travel between 1 and 10 millimeters, which corresponds to a unitary measuring volume between about 80 and 10,000 mm$^3$. It is common experience for the production difficulties to increase, both when one tries to make pistons with a diameter smaller than 10 mm and when one wishes to manufacture pistons with a diameter greater than 35 mm. In particular, a diameter increase of the piston, in order to adapt the device and in particular its second measuring chamber to high rates or volumes, would therefore not be a satisfactory solution.

BRIEF SUMMARY

The present invention aims to avoid these difficulties, and it therefore aims to provide a solution of the type considered here but adapted to large injection rates, typically greater than 100 liters per minute, while remaining economical.

To that end, the invention relates to a method making it possible to analyze the step-by-step injection rate provided by the fuel injection system used in a heat engine, the method comprising, in a known manner:

injecting fuel into a first constant-volume measuring chamber, measuring the pressure and temperature reigning in the first measuring chamber, at least partially draining said first measuring chamber towards a second measuring chamber, in which the fuel drained from the first measuring chamber is sent, the second measuring chamber having a volume that varies depending on the movement of a piston inside this measuring chamber, measuring the movement of the piston in the second measuring chamber, and analyzing the pressure and temperature measurements in the first measuring chamber and movement of the piston, in the second measuring chamber, The partial draining of the first measuring chamber in the second measuring chamber after injection being done until the pressure reigning therein before the injection is reestablished, this method being, according to the invention, essentially characterized by the fact that the partial draining of the first measuring chamber into the second measuring chamber after each injection is done in several stages, successively, the second measuring chamber itself being drained each time, and due to the fact that the volume measurements by movement of the piston in the second measuring chamber, for each filling/emptying of said measuring chamber, are added so as to obtain a total volume corresponding to the quantity of fuel delivered by the injector for an injection step.

Thus, according to the solution proposed here, the structure of the device is practically not modified, in particular regarding the second measuring chamber, but the use of this second measuring chamber is different, as well as the processing method for the information provided by the sensors:

In operation (already recalled above) of the known device, after each injection step, the first measuring chamber is partially drained, but all at once, into the second measuring chamber then, once the electronic system has finished the pressure and temperature measurements in the first measuring chamber and movement of the piston in the second measuring chamber, which occurs in a very short time, the second measuring chamber is partially drained in turn, but here again all at once. The measurement of the quantity of injected fuel (for the considered injection step) is then available, for any exploitation, and the device is ready to receive the following injection step.

According to the method of the invention, the first measuring chamber is drained in several successive stages, after each injection step. The drained volume is thus fractionated, and the electronic system will be able to characterize the volume of injected fuel as being the sum of partial measurements, each of which corresponds to the movement of the piston during each filling/emptying cycle of the second measuring chamber. In other words, the "small" capacity of the second measuring chamber is used several times to measure a "large" quantity of fuel injected into the first measuring chamber.

Thus, the invention allows an adaptation to large injection rates, by avoiding a proportional enlargement of the second measuring chamber and on the contrary keeping, for that measuring chamber and in particular for its piston, usual dimensions for measuring small or medium quantities of fuel. The solution proposed here practically does not cause any additional cost for the components of the device, only the operation and the information processing method, essentially controlled by software, being different.

As an example, the partial draining of the first measuring chamber into the second measuring chamber can be fractionated into approximately ten successive filling/draining cycles of the second measuring chamber. In this way, a second measuring chamber with a capacity of 3000 mm$^3$ will easily be able to measure a volume of 30,000 mm$^3$, corresponding to the capacity of the first measuring chamber, by performing ten successive partial filling/draining cycles.

The method according to the invention is in particular suitable for fuel injection systems with a high rate but a low injection frequency, i.e. adapted to heat engines with a low speed of rotation. While the known device is intended for injection systems that can typically deliver 200 mm$^3$ of fuel per injection step and operate typically up to 60 steps per second (i.e. for four-stroke engines whereof the speed of rotation can reach 7200 revolutions per minute), the method of the invention can typically be applied to injection systems that can deliver 20,000 mm$^3$ of fuel per injection step and operate up to two sets per second. The values mentioned here are used only to provide orders of magnitude corresponding to real and current situations and needs, but they are of course in no way limiting.

BRIEF DESCRIPTION OF THE DRAWINGS

The invention will be better understood using the following description, in reference to the appended diagrammatic drawing illustrating, as an example, an embodiment of the injection rate analysis method according to the invention.

DETAILED DESCRIPTION

Figure 1:
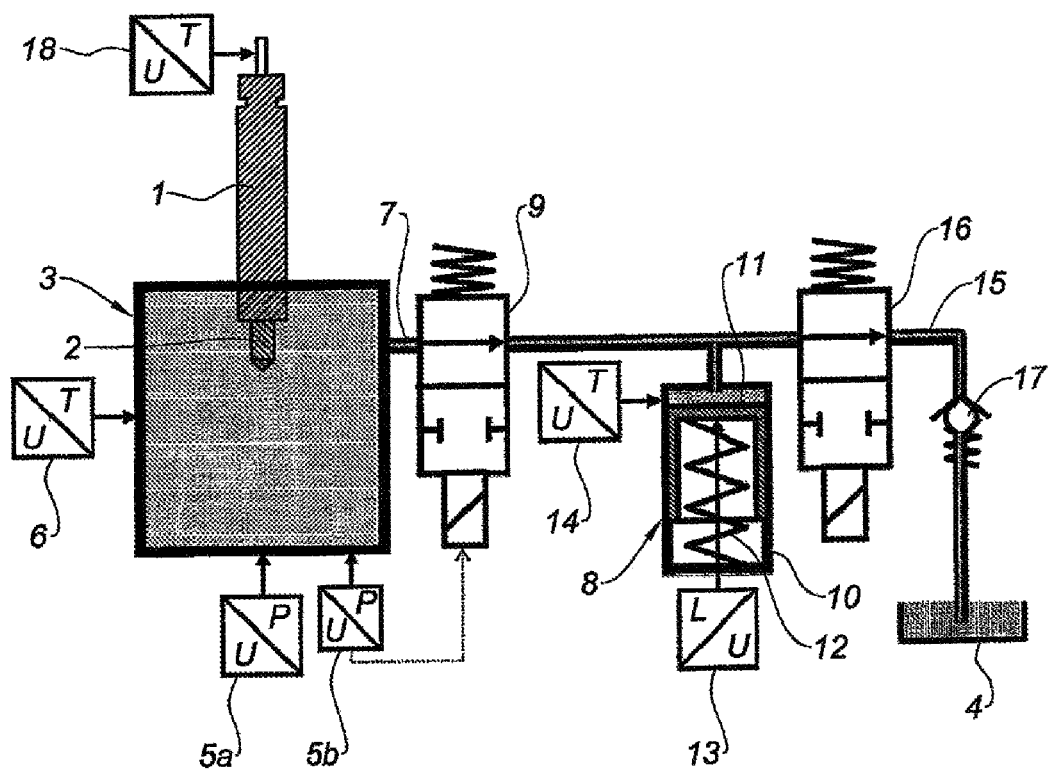
FIG. 1 shows a simplified view of the device used with its two measuring chambers.

FIG. 1 shows an injector 1, the injection nozzle 2 of which is in a first measuring chamber 3, which is a constant-volume chamber. The first measuring chamber 3 is, in use, filled with a fluid that has hydraulic characteristics close to those of a fuel, but has a much higher flash point temperature than that of a fuel, in order to minimize the risks of fire and explosion. This fluid is also the fluid used in the injector 1. A reservoir 4 of this fluid is provided in the device.

In the illustrated example, the first measuring chamber 3 advantageously includes, as pressure sensor, a dynamic pressure converter 5a and a static pressure converter 5b. The dynamic pressure converter 5a, which can be made in the form of a piezoelectric converter, is responsible for measuring the dynamic component for which one seeks a high resolution—typically 0.001 bar—and a quick response. The static pressure converter 5b, which can be made in the form of a piezoresistive converter, is responsible for measuring the static component for which one essentially seeks a large dynamic, typically from 1 to 250 bars.

The first measuring chamber 3 is also equipped with a quick response temperature sensor 6.

The first measuring chamber 3 includes an outlet 7 that is oriented towards a second measuring chamber 8, thus situated (in reference to the direction of circulation of the fluid) downstream of the first measuring chamber 3. An electrovalve 9 is positioned between the first measuring chamber 3 and the second measuring chamber 8.

The second measuring chamber 8 is a variable volume chamber. It is made as a cylinder 10 in which a piston 11 is slidingly mounted, subjected to the thrust of a spring 12. The movement of the piston 11 is detected by a movement sensor 13, for example made in the form of an inductive sensor. A temperature converter 14 is also associated with the second measuring chamber 8.

Leaving from this second measuring chamber 8 is a drain channel 15, the opening and closing of which are controlled by a drain electrovalve 16, downstream of which a check valve 17 is placed. The drain channel 15 brings the fluid back to the reservoir 4 already mentioned.

The device also comprises, in a non-illustrated manner, an electronic section that controls the device assembly and analyzes the information received from the different sensors. In particular, the electronic section:

controls the electrovalve 9 to direct the fluid coming from the outlet 7 of the first measuring chamber 3, towards the second measuring chamber 8;

controls the drain electrovalve 16 in order to drain the second measuring chamber 8 and return the fluid to the reservoir 4;

receives and processes the pressure and temperature measuring signals delivered by the sensors or converters 5a, 5b and 6 associated with the first measuring chamber 3;

receives and processes the movement signals of the piston 11 of the second measuring chamber 8 delivered by the corresponding movement sensor 13.

During the use of the device, to fill the first measuring chamber 3, fluid is pumped into the reservoir 4 using a pump (not shown). The fluid that fills this first measuring chamber 3 has, initially, a pressure Po equal to a predetermined set value. The measurement strictly speaking can then begin, according to the process described below:

The injector 1 performs, by its nozzle 2, an injection of fluid into the first measuring chamber 3. Owing to the converters a and 5b, the pressure P, and in particular the increase of the pressure in the first measuring chamber 3, is then measured, which makes it possible to determine the curve of the injected fluid rate as a function of time, possibly performing a correction as a function of the temperature T detected by the sensor 6. When the pressure in this first measuring chamber 3 no longer increases, it is deduced that the injection is finished.

The electrovalve 9 is then opened for a first time, to transfer a quantity of fluid from the first measuring chamber 3 towards the second measuring chamber 8. Thus, the first measuring chamber 3 is partially drained, while the volume of the second measuring chamber 8 increases, which is accompanied by a movement of the piston 11 that is measured by the movement sensor 13.

Then, the electrovalve 9 is temporarily closed, while the electrovalve 16 is opened to drain the second measuring chamber 8 and to thus bring the fluid said chamber 8 contained into the reservoir 4.

The electrovalve 9 is then reopened, to perform a new partial draining of the first measuring chamber 3 and a new filling of the second measuring chamber 8, accompanied by a new movement of the piston 11, also measured by the sensor 13, after which the second measuring chamber 8 is again drained by opening the electrovalve 16.

The same filling/draining cycle of the second measuring chamber 8 is again repeated several times, until the pressure in the first measuring chamber 3 returns to its initial set value Po.

Each movement of the piston 11 has a corresponding volume variation of the measuring chamber 8. The electronic section determines this volume variation, correcting it as a function of the signal provided by the temperature sensor (converter 14). Moreover, the electronic section adds the partial volumes V1, V2, . . . Vn of fluid determined for the successive movements of the piston 11, so as to obtain a total volume, which corresponds to the quantity of fluid that has been injected into the first measuring chamber 3.

At the end of this operating phase, the first measuring chamber 3 having returned to its initial pressure, a new injection can take place in this first measuring chamber 3, which will again be partially drained in several stages into the second measuring chamber 8, and so on.

Figure 2:
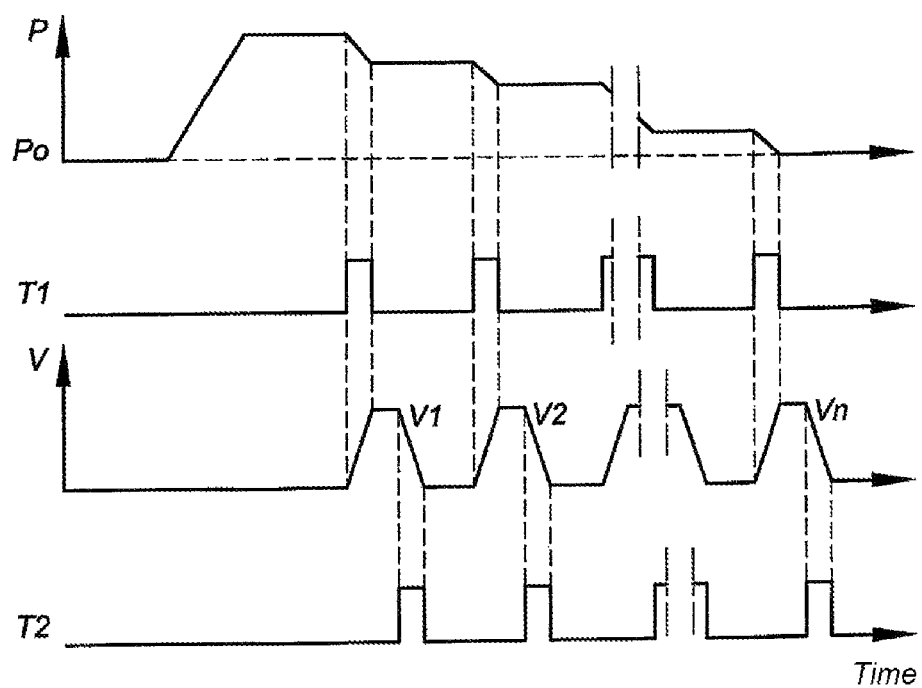
FIG. 2 is a diagram illustrating the operation of the device of FIG. 1, therefore the progression of the method according to the invention.

This operation is illustrated by the diagram of FIG. 2, the successive lines of which show (from top to bottom), for an injection step:

The variation of the pressure P in the first measuring chamber 3;

The opening times T1 of the electrovalve 9;

The variations of the volume V of the second measuring chamber 8;

The opening times T2 of the drain electrovalve 16.

In one alternative that is not shown, but with similar overall operation, the electrovalve 9 placed between the two measuring chambers 3 and 8 is replaced by a static pressure regulator, subjugated on the static pressure converter 6, which can procure a certain cost reduction in the production of the device.

It should be noted that the temperature can be measured and taken into account at other various places, in particular just upstream of the first measuring chamber 3, by an additional temperature sensor 18, to assess the quick temperature variations of the injected fluid before it is mixed and therefore equalized in temperature with the substantial quantity of fluid already contained in said first chamber 3.

It would not be outside the scope of the invention, as defined in the appended claims, to modify constructive details of the device for implementing the method, or by adapting the operation thereof, in particular by providing any number whatsoever of successive filling/draining steps of the second measuring chamber, for each draining of the first measuring chamber, therefore upon each injection step.

The invention claimed is:

1. A method for analyzing a step-by-step injection rate provided by a fuel injection system used in a heat engine, the method comprising:
    injecting fuel into a first constant-volume measuring chamber,
    measuring a pressure and temperature in the first measuring chamber,
    at least partially draining said first measuring chamber towards a second measuring chamber, in which the fuel drained from the first measuring chamber is sent, the second measuring chamber having a volume that varies depending on movement of a piston inside this measuring chamber,
    measuring the movement of the piston in the second measuring chamber, and
    analyzing the pressure and temperature measurements in the first measuring chamber and movement of the piston, in the second measuring chamber,
    performing the partial draining of the first measuring chamber in the second measuring chamber until the pressure in the first measuring chamber returns to the pressure measured before the injection,
    wherein the partial draining of the first measuring chamber into the second measuring chamber after each injection is done in several stages, successively, the second measuring chamber itself being drained each time, and wherein the volume measurements by movement of the piston in the second measuring chamber, for each filling/emptying of said measuring chamber, are added so as to obtain a total volume corresponding to a quantity of fuel delivered by the injector for an injection step.

2. The method according to claim 1, wherein the partial draining of the first measuring chamber into the second measuring chamber is fractionated into approximately ten successive filling/draining cycles of the second measuring chamber.

* * * * *